(12) United States Patent
Lee et al.

(10) Patent No.: US 7,450,597 B2
(45) Date of Patent: Nov. 11, 2008

(54) WIRELESS NETWORK DEVICE AND METHOD FOR REASSOCIATION BETWEEN WIRELESS NETWORKS USING THE WIRELESS NETWORK DEVICE

(75) Inventors: Joon-hee Lee, Gunpo-si (KR); Seung-seop Shim, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 93 days.

(21) Appl. No.: 11/219,642

(22) Filed: Sep. 7, 2005

(65) Prior Publication Data
US 2006/0058029 A1    Mar. 16, 2006

(30) Foreign Application Priority Data
Sep. 15, 2004    (KR)    ........................ 10-2004-0073829

(51) Int. Cl.
*H04L 12/28* (2006.01)
*H04L 12/56* (2006.01)

(52) U.S. Cl. ........................ 370/401; 370/235; 370/252; 370/310; 370/312; 370/328; 709/228; 709/229

(58) Field of Classification Search ................ 370/401, 370/310.2, 312, 320, 328, 338, 341, 348, 370/349, 351, 389, 392, 395.21, 395.5, 235, 370/466, 467, 252, 329, 356; 709/228, 229
See application file for complete search history.

(56) References Cited

U.S. PATENT DOCUMENTS

| | | | |
|---|---|---|---|
| 6,449,722 B1 | 9/2002 | West et al. | |
| 6,473,413 B1 | 10/2002 | Chiou et al. | |
| 6,879,574 B2 * | 4/2005 | Naghian et al. | 370/338 |
| 6,925,064 B2 * | 8/2005 | Hester et al. | 370/255 |
| 6,925,069 B2 * | 8/2005 | Koos et al. | 370/334 |
| 7,016,336 B2 * | 3/2006 | Sorensen | 370/351 |
| 7,126,926 B1 * | 10/2006 | Bjorklund et al. | 370/328 |
| 2003/0012163 A1 * | 1/2003 | Cafarelli et al. | 370/338 |
| 2003/0016636 A1 * | 1/2003 | Tari et al. | 370/328 |
| 2003/0120821 A1 | 6/2003 | Thermond et al. | |
| 2003/0142643 A1 * | 7/2003 | Yang et al. | 370/328 |
| 2003/0152059 A1 * | 8/2003 | Odman | 370/338 |
| 2003/0235175 A1 * | 12/2003 | Naghian et al. | 370/338 |
| 2004/0068668 A1 * | 4/2004 | Lor et al. | 713/201 |
| 2004/0098586 A1 | 5/2004 | Rebo et al. | |
| 2004/0122956 A1 * | 6/2004 | Myers et al. | 709/228 |
| 2005/0152305 A1 * | 7/2005 | Ji et al. | 370/328 |
| 2006/0080460 A1 * | 4/2006 | Kobayashi et al. | 709/238 |

FOREIGN PATENT DOCUMENTS

| | | |
|---|---|---|
| KR | 2003-0077817 A | 10/2003 |
| KR | 2003-0088724 A | 11/2003 |
| KR | 10-2004-0004726 A | 1/2004 |
| WO | WO 02/089411 A2 | 11/2002 |

* cited by examiner

*Primary Examiner*—Matthew Anderson
*Assistant Examiner*—Shaima Q Aminzay
(74) *Attorney, Agent, or Firm*—Sughrue Mion, PLLC

(57) ABSTRACT

A wireless network device and a method for reassociation between wireless networks using the wireless network device designed to simplify a reassociation process of the device moving between the wireless networks are provided. The wireless network device includes a first frame transceiver receiving a reassociation request frame from a predetermined device, a device identifier (ID) extractor extracting a device ID from the reassociation request frame, and a first controller determining a reassociation process of the device that has sent the reassociation request frame according to the extracted device ID.

16 Claims, 9 Drawing Sheets

WIRELESS NETWORK DEVICE AND METHOD FOR REASSOCIATION BETWEEN WIRELESS NETWORKS USING THE WIRELESS NETWORK DEVICE

CROSS-REFERENCE TO RELATED APPLICATION

This application claims priority from Korean Patent Application No. 10-2004-0073829 filed on Sep. 15, 2004 in the Korean Intellectual Property Office, the disclosure of which is incorporated herein by reference in its entirety.

BACKGROUND OF THE INVENTION

1. Field of the Invention

The present invention relates to a wireless network device and a method for reassociation between wireless networks using the wireless network device, and more particularly, to a wireless network device and a method for reassociation between wireless networks using the wireless network device designed to simplify a reassociation process of the device moving between the wireless networks.

2. Description of the Related Art

With the advancement in communication and network technologies, a wired network environment using wired media such as coaxial or optical cables is evolving into a wireless one using wireless signals in various frequency bands.

In line with the transition from wired to wireless technology, a computing device that contains a wireless interface module, enables mobility, and performs specific functions by processing various information (hereafter "a wireless network device") is being developed and wireless technologies that enable effective communication between wireless devices on a wireless network are emerging.

There are two major architectures of wireless networks: infrastructure and ad-hoc networks.

As shown in FIG. 1, the infrastructure network contains an access point (AP) 110. On the other hand, as shown in FIG. 2, the ad-hoc network does not require an AP for communication.

In an infrastructure mode, an AP not only has connectivity to the wired network but also provides communication among wireless network devices within a wireless network. Thus, all data traffic in the infrastructure network is relayed through the AP.

In an ad-hoc mode, wireless network devices within a single wireless network can directly communicate with one another without using an AP.

Such wireless networks can be further classified into two types based on the presence of a coordinator.

In one type of network, which is called a "coordinator-based wireless network", a randomly selected wireless device acts as a coordinator that allocates channel time to other wireless devices within the same wireless network for data transmission, and then the other wireless devices are allowed to transmit data only at the allocated time.

Unlike the coordinator-based wireless network, the other type of network allows all network devices to transmit data at any time desired without using a coordinator.

The coordinator-based wireless network is a single independent coordinator-centered network. When there are multiple coordinator-based wireless networks within a certain area, each network has a unique ID to distinguish itself from others.

Thus, while wireless devices can transmit data to and receive data from other network devices during channel time allocated by the coordinator on a coordinator-based network where they belong, they are not allowed to communicate with wireless devices belonging to another coordinator-based network.

For example, in a home network system containing two coordinator-based wireless networks, that is, first and second wireless networks 20 and 30, as shown in FIG. 3, it is assumed that the first wireless network 20 is provided in a living room and the second wireless network 30 is provided in a bedroom, respectively.

If a user desires to watch movies stored on a media server 31 in the living room using a portable moving picture player 21 in the living room, then the user cannot watch movies since there is no way to communicate between the first and second wireless networks 20 and 30. Thus, to watch the movies, the user has to go to the bedroom.

This problem may arise by restriction on range of radio waves, absence of information on another coordinator-based wireless network, and channel time allocation (CTA).

In addition, when the user moves from the living room to the bedroom to watch the movie, a portable moving picture player 21 attempts to reassociate with the second wireless network 30 after disassociating from the first wireless network 20. When the portable moving picture player 21 attempts to associate with the first wireless network 20, a coordinator of the second wireless network 30 allocates an identifier to the portable moving picture player 21 to distinguish it from other wireless network devices in the second wireless network 30.

Thus, there is an increasing demand for construction of a new network topology for data transmission and reception between wireless devices belonging to different coordinator-based wireless networks.

While an Institute of Electrical and Electronics Engineers (IEEE) 802.11x-based Wireless Local Area Network (WLAN) supports association/disassociation between wireless networks, a Wireless Personal Area Network (WPAN) such as IEEE 802.15.3, IEEE 802.15.1 or IEEE 802.15.4 WPAN provides a separate specification for association/disassociation between wireless networks. Thus, there is an urgent need to develop a method for association/disassociation between WPANs.

Korean Laid-open Patent Application No. 2004-0004726 proposes a method for reducing delay caused by frequent mobile host authentications in a WLAN environment using a reduced authentication token. However, the above-cited reference describes only a method for reducing authentication delay based on IEEE 802.11x. However, there has been no teaching nor suggestion based on IEEE 802.15.x.

SUMMARY OF THE INVENTION

The present invention provides a wireless network device designed to improve mobility by reducing reassociation delay time required to move from the existing wireless network to a new wireless network and a method for reassociation between wireless networks using the wireless network device.

According to an aspect of the present invention, there is provided a wireless network device including a first frame transceiver receiving a reassociation request frame from a predetermined device, a device identifier (ID) extractor extracting a device ID from the reassociation request frame, and a first controller determining a reassociation process of the device that has sent the reassociation request frame according to the extracted device ID.

According to another aspect of the present invention, there is provided a wireless network device including a second frame transceiver sending a reassociation request frame to a coordinator of a wireless network to which a device attempts to move, and a second controller performing reassociation to the wireless network through a reassociation process determined according to a device ID contained in the reassociation request frame.

According to still another aspect of the present invention, there is provided a method of reassociation between wireless networks using a wireless network device, the method including receiving a reassociation request frame from a predetermined device, extracting a device ID from the reassociation request frame, and determining a reassociation process of the device that has sent the reassociation request frame according to the extracted device ID.

According to a further aspect of the present invention, there is provided a method of reassociation between wireless networks using a wireless network device, the method including sending a reassociation request frame to a coordinator of a wireless network to which a device attempts to move, and performing reassociation to the wireless network through a reassociation process determined according to a device ID contained in the reassociation request frame.

BRIEF DESCRIPTION OF THE DRAWINGS

The above and/or other aspects of the present invention will become more apparent by describing in detail exemplary embodiments thereof with reference to the attached drawings in which.

DETAILED DESCRIPTION OF EXEMPLARY EMBODIMENTS OF THE INVENTION

Figure 1:
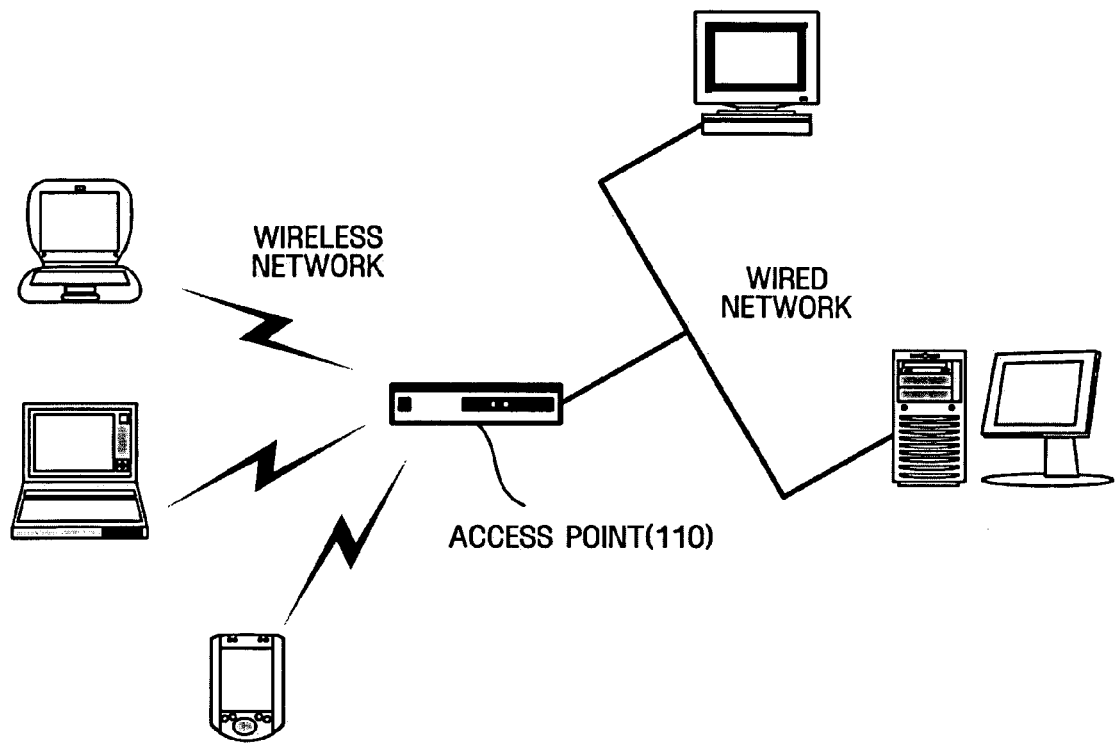
FIG. 1 is an exemplary diagram of a typical infrastructure mode wireless network.
Figure 2:
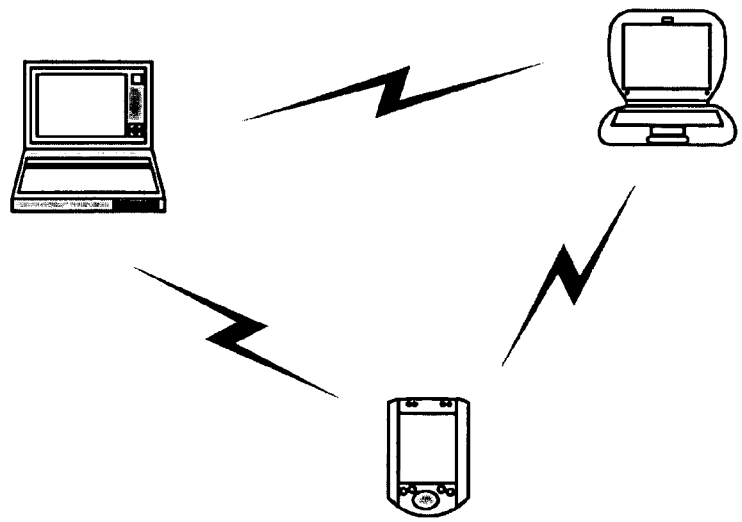
FIG. 2 is an exemplary diagram of a typical ad-hoc mode wireless network.
Figure 3:
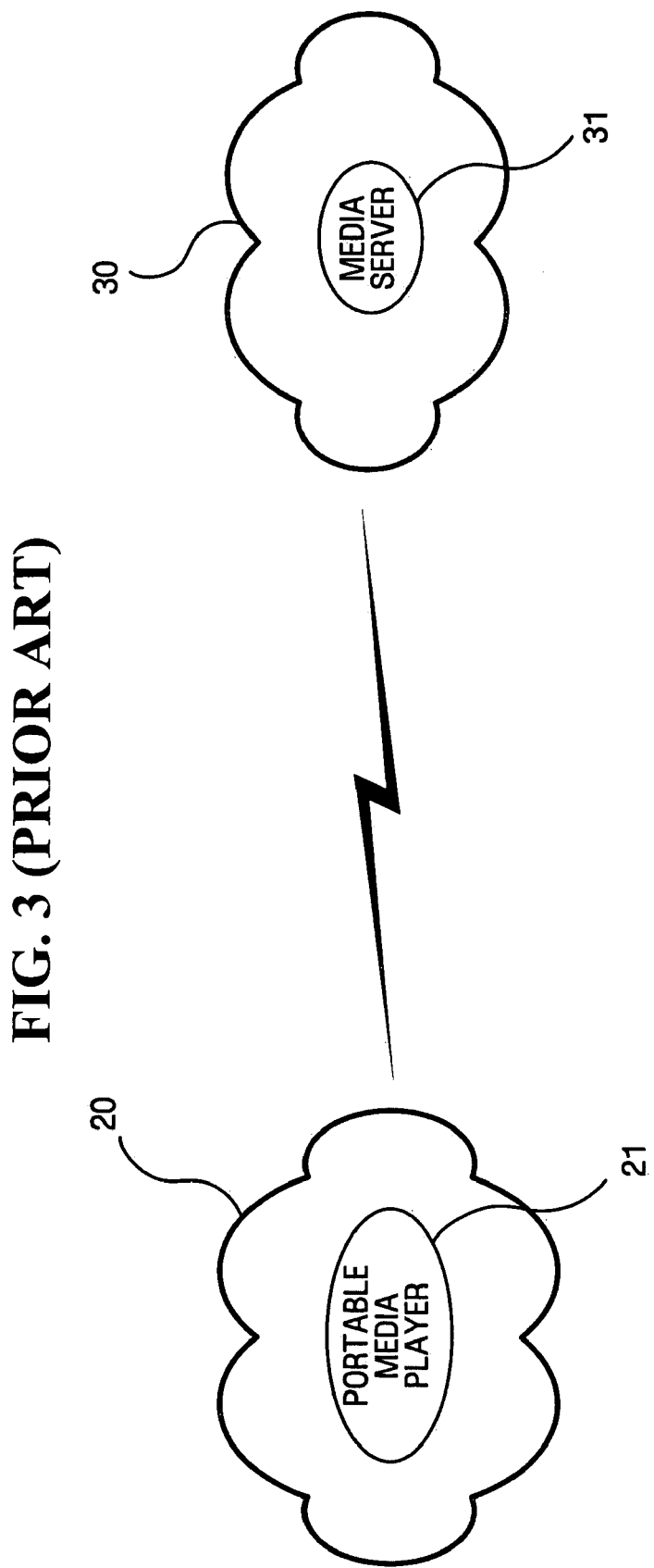
FIG. 3 is an exemplary diagram of a typical coordinator-based wireless network.

The present invention and methods of accomplishing the same may be understood more readily by reference to the following detailed description of exemplary embodiments and the accompanying drawings. The present invention may, however, be embodied in many different forms and should not be construed as being limited to the exemplary embodiments set forth herein. Rather, these exemplary embodiments are provided so that this disclosure will be thorough and complete and will fully convey the concept of the invention to those skilled in the art, and the present invention will only be defined by the appended claims. Like reference numerals refer to like elements throughout the specification.

The present invention will now be described more fully with reference to the accompanying drawings, in which exemplary embodiments of the invention are shown. It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which are executed via the processor of the computer or other programmable data processing apparatus, create means for implementing the functions specified in the flowchart block or blocks.

These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks.

The computer program instructions may also be loaded onto a computer or other programmable data processing apparatus to cause a series of operational steps to be performed on the computer or other programmable apparatus to produce a computer implemented process such that the instructions that are executed on the computer or other programmable apparatus provide steps for implementing the functions specified in the flowchart block or blocks.

And each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

Meanwhile, IEEE 802.15.3 proposes standards for a Physical Layer (PHY) layer corresponding to a Physical Layer of the seven layers of the Open System Interconnection (OSI) network model developed by the International Organization for Standardization (ISO) for wireless networks and a Medium Access Control (MAC) layer corresponding to a Data-link Layer.

Therefore, to assist in better understanding the present invention, a WPAN compliant with the IEEE 802.15.3 standard, and more particularly, a network system for enabling data communication between wireless network devices belonging to different WPANs by connecting multiple WPANs via a wired backbone at an MAC layer will now be described as an exemplary embodiment of a coordinator-based wireless network.

In addition, for consistent use of terms, a wireless network device and a single network created by one or more devices are hereinafter referred to as a "device" and a "piconet", respectively, as defined in a WPAN.

Meanwhile, a coordinator is randomly selected among network devices within a single wireless network and allocates "channel time" to other network devices within the same network for data transmission. The coordinator may also allocate logical addresses to network devices within the same network to which it belongs. The coordinator broadcasts physical addresses and logical addresses of network devices within a coordinator-based wireless network to which it belongs so that each network device becomes aware of physical/logical address pairs of all other network devices.

A physical address is a hardware address that uniquely identifies each network device on a network and is preset during manufacturing of the device. That is, the physical address of each network device is unique across the entire network. A logical address is another type of address that uniquely identifies each network device on a network and is allocated by a coordinator. The logical address has a unique value within a coordinator-based network. Thus, when a network device disassociates from the existing wireless network and associates with a new wireless network, the network device can be allocated a new logical address, which is unique across the other wireless network, by a coordinator in the other wireless network.

A backbone physical address uniquely identifies a network device connecting to a wired backbone network on the wired backbone network. That is, the backbone physical address is a physical address format used in the wired backbone network.

Figure 4:
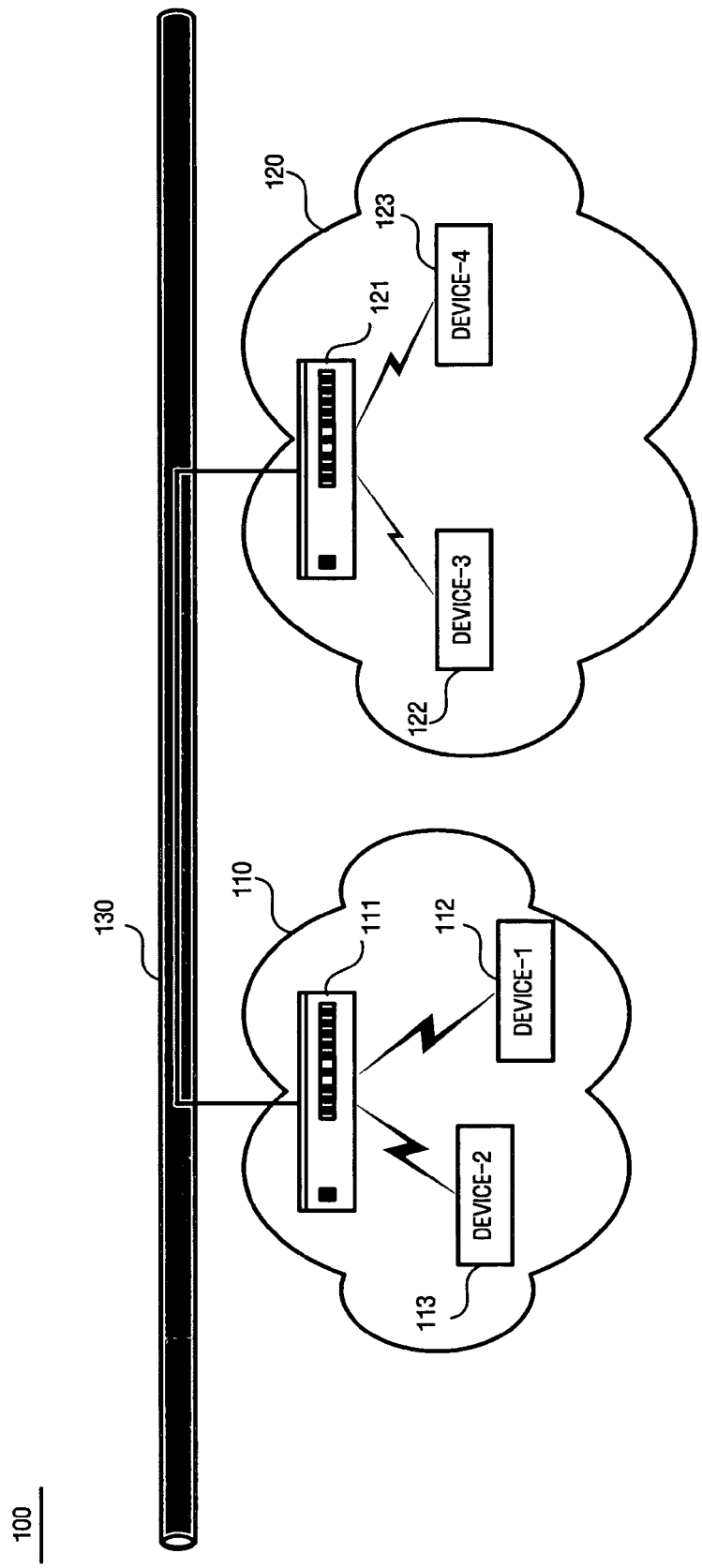
FIG. 4 shows a network system according to an exemplary embodiment of the present invention.

FIG. 4 is a diagram of a network system 100 according to an exemplary embodiment of the present invention.

Referring to FIG. 4, the network system 100 includes a plurality of piconets 110 and 120 and a wired backbone network 130 connecting the piconets 110 and 120.

The piconets 110 and 120 enable both wired and wireless communications and respectively include repeaters 111 and 121 connecting the piconets 110 and 120 to the wired backbone network 130 and a plurality of devices 112, 113, 122, and 123 performing wireless communications. In this case, for clear distinction, the piconets 110 and 120 are hereinafter called first and second piconets, respectively.

While the exemplary embodiment shown in FIG. 4 shows that the piconets 110 and 120 are connected through the wired backbone network 130, they may be connected through a wireless network.

Further, a device acting as a coordinator may be selected among the devices belonging to either the first or second piconets 110 or 120. In a WPAN, the device acting as a coordinator is named a "Piconet coordinator" (PNC). The repeaters 111 and 121 as well as the devices 112, 113, 122, and 123 may be designated as a PNC.

In the present exemplary embodiment, it is assumed that the repeater 111 or 121 belonging to the piconet 110 or 120 serves as a coordinator.

To more clearly distinguish between the repeaters 111 and 121, they are hereinafter referred to as the first and second repeaters, respectively. Each of the first and second repeaters 111 and 121 may include a router, a wired/wireless bridge, a device, or a PNC depending on the type of network topology. The first and second repeaters 111 and 121 may connect a wired network with a wireless network or connect wireless networks with each other.

Meanwhile, the wired network 130 can comply with any wired network protocol based on a communication medium such as coaxial cable, optical cable, power line, or phone line. The protocol for the wired network 130 may vary depending on a physical environment where the present invention is applied.

In the present exemplary embodiment, when a first device 112 desires to communicate with a second device 113, i.e., when a communication is made between devices within the same piconet, it can comply with a conventional IEEE 802.15.3 standard.

However, when the first device 112 belonging to the first piconet 110 wishes to communicate with the second device 113 belonging to the second piconet 113, that is, when a communication is made between devices belonging to different piconets, it is very difficult to implement a communication mechanism only with a frame format compliant with the conventional IEEE 802.15.3 standard.

The conventional IEEE 802.15.3 standard supports an eight-byte MAC address as a physical address of a device and converts the eight-byte MAC address into a one-byte logical device ID (DevID) to reduce an MAC header overhead when generating an MAC frame. A device ID is information for identifying a device from others. A device ID of each device may be determined by a PNC. However, it is often the case that device IDs of different piconet devices cannot be identified from one another. Thus, when a device moves from one piconet to another, duplicate device IDs may be allocated to the device.

Therefore, the present invention proposes, when a device to which a device ID was allocated by the existing piconet moves to a new piconet, a method for simplifying a process of reassociation from the existing piconet to the new piconet depending on whether duplicate device IDs have been allocated to the device.

More specifically, when the device with a device ID allocated on the existing piconet intends to reassociate with a new piconet, the device sends a reassociation request frame based on the previously allocated device ID to a PNC of the new piconet and the PNC determines a reassociation process by determining whether the device ID contained in the reassociation request frame is identical with a device ID allocated to the device in the new piconet.

The reassociation process determined by the PNC will be described in more detail later.

Figure 5:
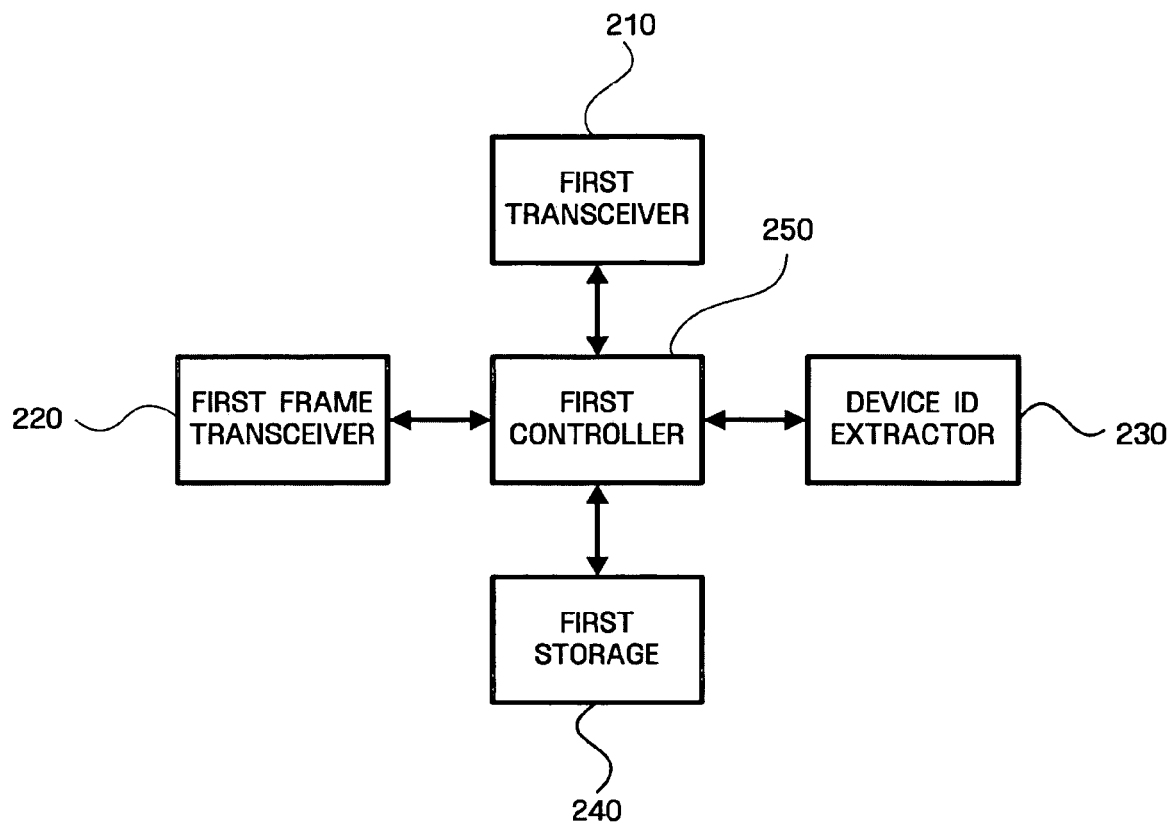
FIG. 5 is a diagram of a coordinator allocating a device ID to a device transmitting a reassociation request frame according to an exemplary embodiment of the present invention.

FIG. 5 is a diagram of a coordinator allocating a device ID to a device transmitting a reassociation request frame according to an exemplary embodiment of the present invention.

The coordinator shown in FIG. 5 can be the first or second repeaters 111 or 121 in the first or second piconet 110 or 120 shown in FIG. 4.

Referring to FIG. 5, the coordinator includes a first transceiver 210 transmitting and receiving data through the wired network (130 shown in FIG. 4), a first frame transceiver 220 receiving a reassociation request frame from a predetermined device, a device ID extractor 230 extracting a device ID from the received reassociation request frame, a first storage 240 storing the extracted device ID, and a first controller 250 determining a reassociation process of the device sending the reassociation request frame according to the extracted device ID. In this case, the device ID contained in the received reassociation request frame may be a device ID allocated by the existing piconet the device that has sent the reassociation request frame belonged to or a predesignated reassociation device ID.

The device ID allocated by the existing piconet to which the device belonged and the predesignated reassociation device ID are hereinafter called a "first device ID" and a "second device ID", respectively.

When the device ID contained in the reassociation request frame is the first device ID, the first controller 250 can determine whether the first device ID is the same as device IDs allocated to devices by the piconet to which the coordinator belongs. The device IDs allocated to devices by the piconet to which the coordinator belongs may be stored in the first storage 240 or in a separate memory.

In addition, the first controller 250 can also determine the reassociation process of the device that has sent the reassociation request frame according to the device ID contained in the reassociation request frame.

More specifically, when the device ID of the device that has sent the reassociation request frame is the first device ID, the first controller 250 determines whether the first device ID is the same as device IDs allocated to devices of the piconet to which the coordinator belongs. If it is determined that the first device ID is not the same as the allocated device IDs, the first controller 250 performs a reassociation process based on the first device ID contained in the reassociation request frame. In this case, since the reassociation device ID is not the same as the initial association device ID of the device, the device may perform a reassociation process by sending a reassociation request to the coordinator and receiving a response thereto from the coordinator.

On the other hand, when the device ID of the device that has sent the reassociation request frame is the second device ID, the first controller 250 performs a reassociation process by receiving two reassociation requests and transmitting corresponding responses based on the first device ID and a newly allocated device ID, respectively. The reassociation process consisting of the two reassociation requests and responses can also apply to the case when the first device ID is the same as the device IDs allocated to devices of the piconet to which the coordinator belongs.

Figure 6:
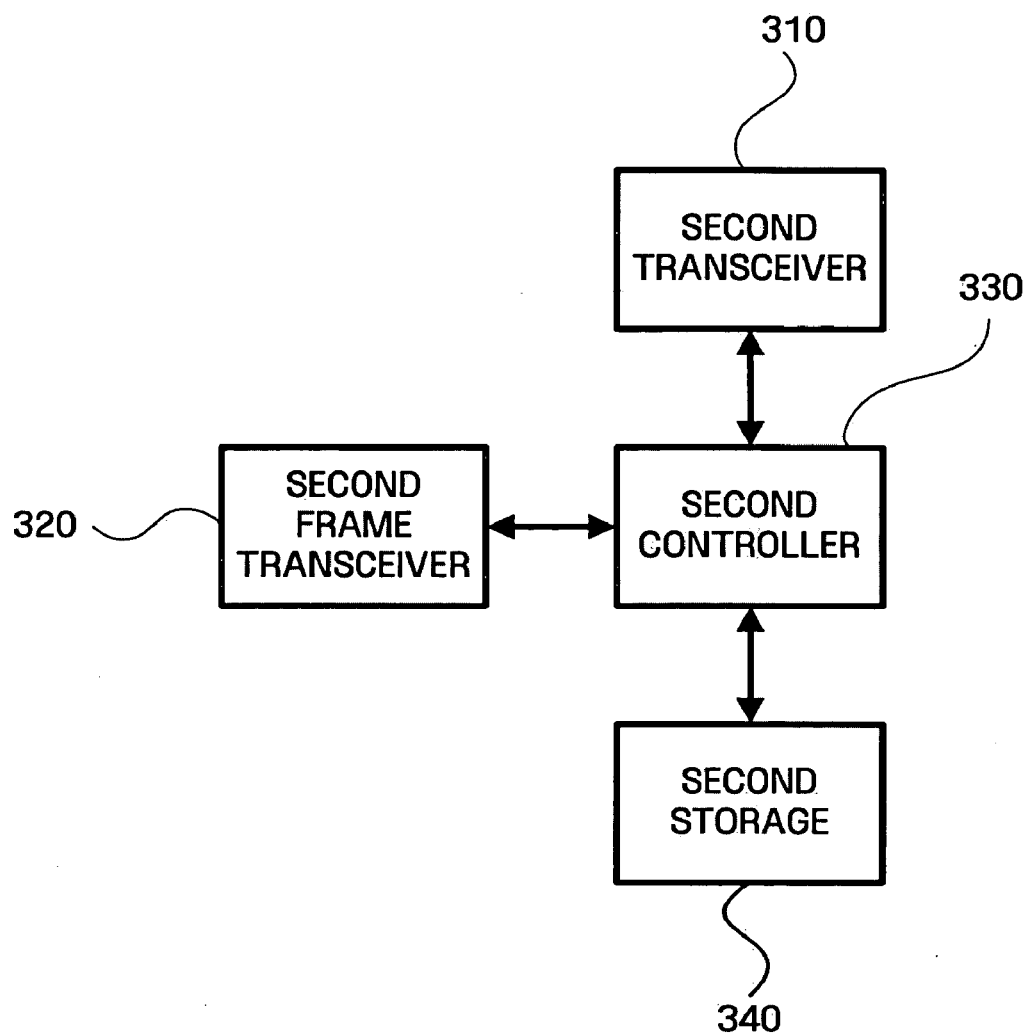
FIG. 6 is a diagram of a device moving from the existing wireless network to a new wireless network for reassociation according to an exemplary embodiment of the present invention.

FIG. 6 is a diagram of a device moving from the existing wireless network to a new wireless network for reassociation according to an exemplary embodiment of the present invention.

The device shown in FIG. 6 may be one of the plurality of devices 112, 113, 122, and 123 in the first and second piconets 110 and 120 shown in FIG. 4.

Referring to FIG. 6, the device includes a second transceiver 310 transmitting and receiving data through the wired network (130 shown in FIG. 4), a second frame transceiver 320 sending a reassociation request frame to a coordinator of the new piconet, and a second controller 330 determining a reassociation process according to a device ID contained in the reassociation request frame and performing reassociation to the new piconet.

In this case, the device ID contained in the reassociation request frame may be a first device ID or a predesignated second device ID that is considered to be an association device ID being used when the device was initially associated with the new piconet.

The second controller 330 may perform a reassociation process on a reassociation response frame by receiving the reassociation response frame to the reassociation request frame from a coordinator of the new piconet.

Figure 7:
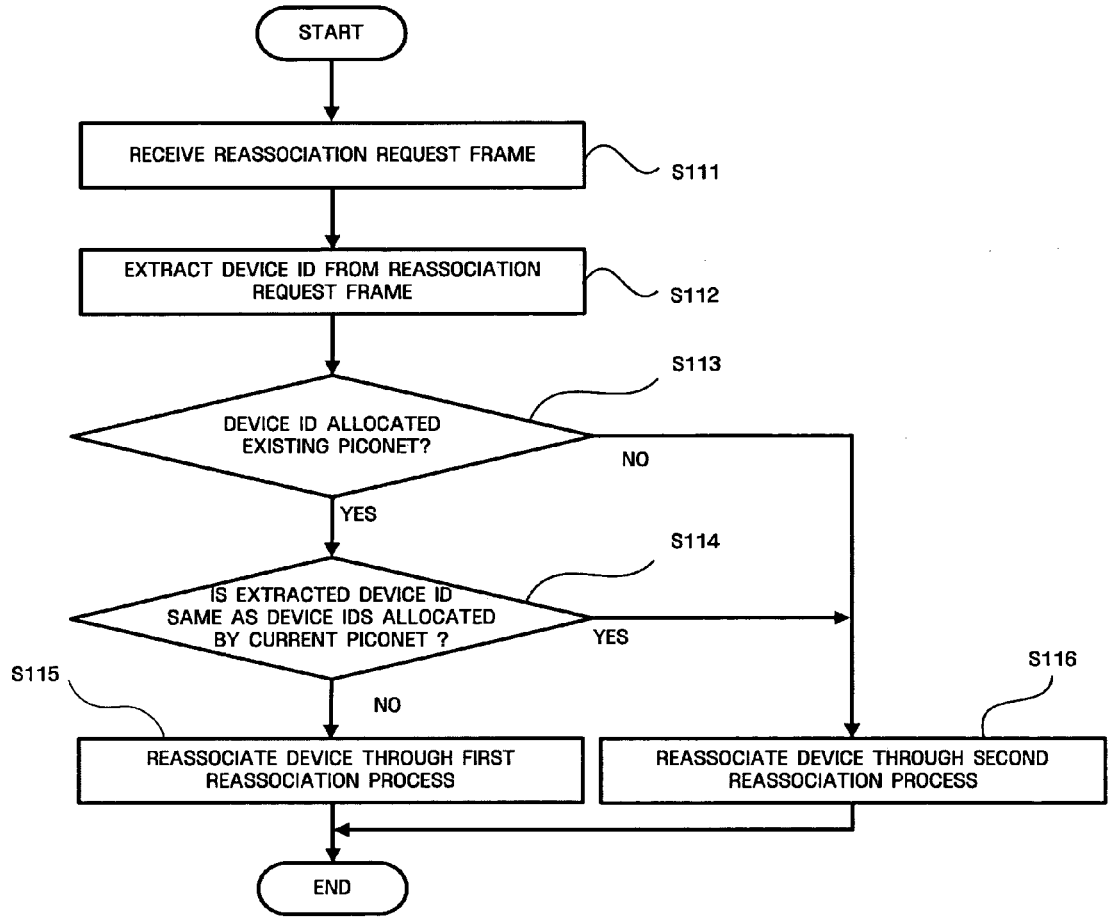
FIG. 7 is a flowchart illustrating a method of reassociating a device sending a reassociation request frame according to an exemplary embodiment of the present invention.

FIG. 7 is a flowchart illustrating a process of the coordinator of a new piconet shown in FIG. 4 reassociating a device that has sent a reassociation request frame according to an exemplary embodiment of the present invention.

In the present exemplary embodiment, it is assumed that the device is the second device 113 (shown in FIG. 4) moving from the first piconet 110 to the second piconet 120.

Referring to FIG. 7, in operation S111, the first frame receiver 220 receives a reassociation request frame from the second device 113 moving the second piconet 120. A device ID contained in the reassociation request frame may be a first or second device ID.

For example, the second device 113 moving from the first piconet 110 to the second piconet 120 may send a reassociation request frame to the second repeater 121 of the second piconet 120. In this case, the reassociation request frame may contain a device ID previously allocated to the second device 113 by the first piconet 110 or a predesignated reassociation device ID.

In operation S112, the device ID extractor 230 extracts a device ID from the reassociation request frame.

In operation S113, the first controller 250 determines whether the extracted device ID is the first device ID that is a device ID allocated by a coordinator of the existing piconet.

In operation S114, if the device ID contained in the reassociation request frame is the first device ID, the first controller 250 determines whether the first device ID is the same as device IDs previously allocated to devices of other piconet as well as by the new piconet to which the current coordinator belongs, as determined through communication with the coordinator of the other piconet.

It can be determined whether there exists duplicate device IDs when the coordinator of the new piconet with which the second device 113 attempts to reassociate connects with the coordinator of the existing piconet through the wired network 130. That is to say, the coordinator of the new piconet may determine device IDs allocated to devices by other piconets including the existing piconet through communication with coordinators of the other piconets connected through the wired network 130.

Figure 8:
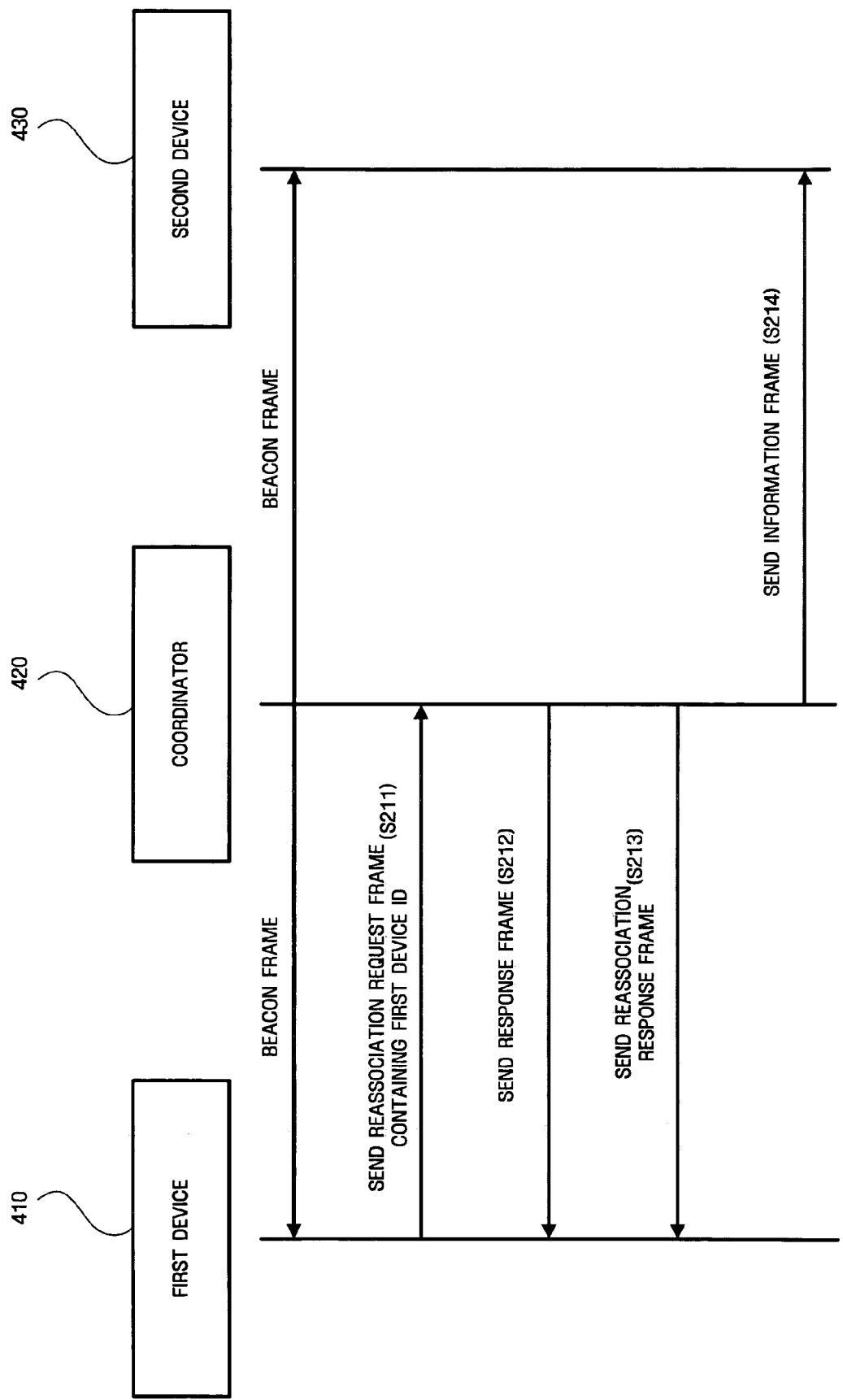
FIG. 8 illustrates a method of reassociating a device when a device ID contained in a reassociation request frame is a device ID allocated by the existing wireless network according to an exemplary embodiment of the present invention.

In operation S115, when the device ID contained in the reassociation request frame is different from those allocated to devices by the new piconet and other piconets, the coordinator of the new piconet reassociates the device through a first reassociation process that will be illustrated in FIG. 8.

Figure 9:
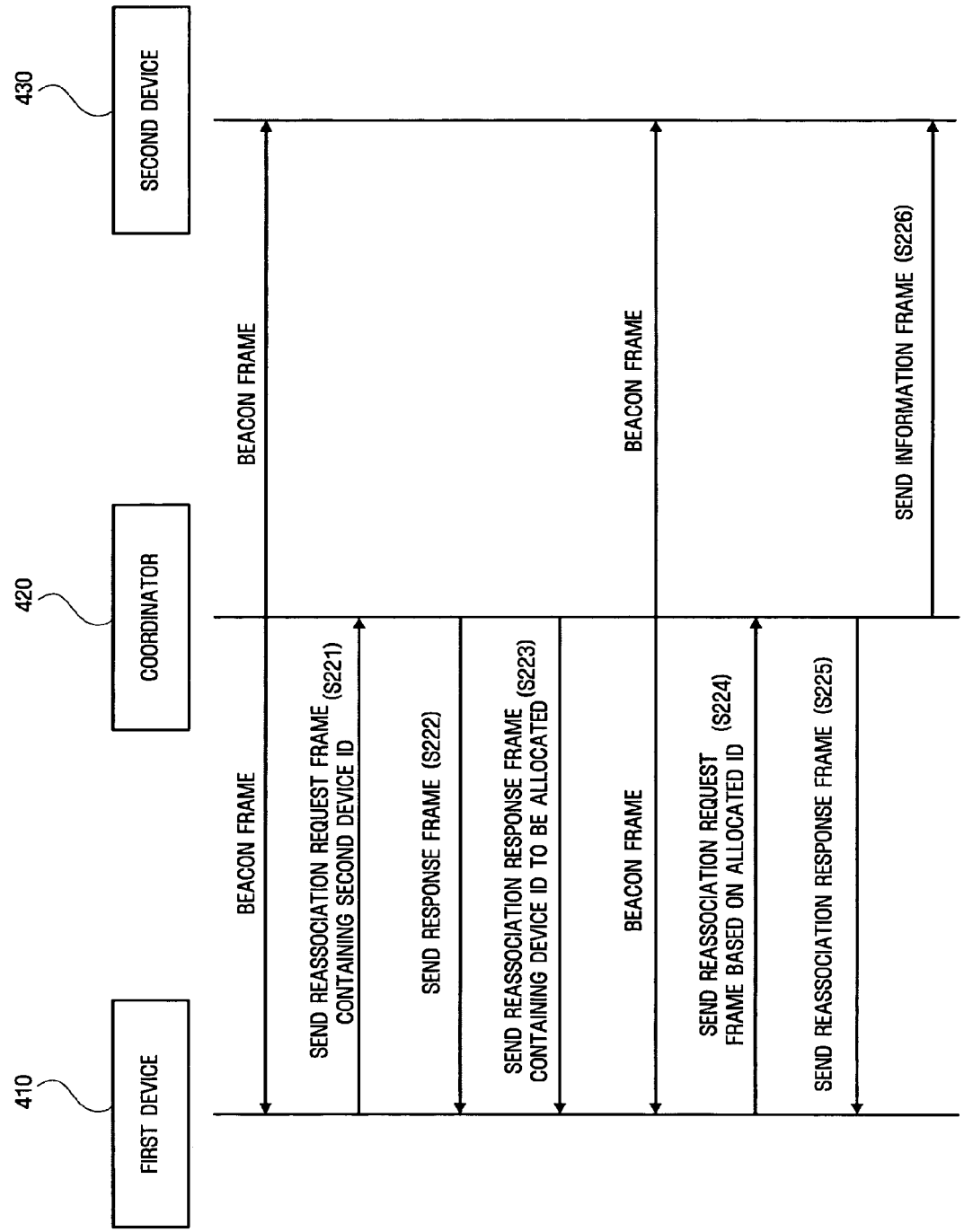
FIG. 9 illustrates a method of reassociating a device when a device ID contained in a reassociation request frame is a device ID predesignated for reassociation according to an exemplary embodiment of the present invention.

Conversely, when the device ID contained in the reassociation request frame is a second device ID or the same as those allocated to devices by the other piconets including the new piconet, the coordinator of the new piconet reassociates the device through a second reassociation process that will be illustrated in FIG. 9 in operation S116.

FIG. 8 illustrates a first reassociation process for a device performed when a device ID extracted from a reassociation request frame is not the same as those allocated to devices by a new piconet which the device attempts to reassociate with.

Referring to FIG. 8, in operation S211, after a coordinator 420 sends a beacon frame to devices in the new piconet to which it belongs, a first device 410 attempting to move to the new piconet transmits a reassociation request frame containing a first device ID allocated by a coordinator of the existing piconet.

The reassociation request frame may also contain a device address. For example, the first device 410 may send a reassociation request frame containing device ID "0x01" and a device address to the coordinator 420.

The coordinator 420 determines whether the device ID contained in the reassociation request frame is the same as device IDs allocated to devices in the new piconet and other piconets. If the device ID is not the same as the allocated device IDs, the coordinator sends a response frame to the first device 410 in operation S212.

Further, in operation S213, the coordinator 420 sends a reassociation response frame to the first device 410 that has sent the reassociation request frame.

After the reassociation response frame is sent, the reassociation process between the first device 410 and the coordinator 420 terminates. In operation S214, the coordinator 420 sends an information frame indicating the reassociation of the first device 410 to other devices in the piconet that it belongs.

For example, when the first device 410 and a second device 430 are present on the current piconet, the coordinator 420 may send the information frame to the second device 430.

FIG. 9 illustrates a second reassociation process performed when a device ID contained in a reassociation request frame is the same as those allocated to devices by the other piconets including the new piconet.

The reassociation process illustrated in FIG. 9 can also apply in the same manner when a device uses a predesignated reassociation device ID instead of a device ID allocated by a coordinator of the existing piconet. In the present exemplary embodiment, the device is assumed to use a second device ID, i.e., a predesignated reassociation device ID.

Referring to FIG. 9, in operation S221, after a coordinator 420 sends a beacon frame to devices in a new piconet to which it belongs, the coordinator 420 receives a reassociation request frame containing the second device ID that is a predesignated reassociation device ID from a first device 410 attempting to move to the new piconet.

A controller (e.g., the first controller 250 shown in FIG. 4) of the coordinator 420 that receives the reassociation request frame through a frame receiver (e.g., the first frame receiver 220 shown in FIG. 4) of the coordinator 420 can determine whether a device ID contained in the reassociation request frame is a first device ID.

In operation 222, when the first controller 250 determines that the device ID contained in the reassociation request frame is a second device ID, the coordinator 430 sends a response frame to the first device 410.

In operation S223, the coordinator simultaneously sends a reassociation response frame containing a device ID that will be allocated to the first device 410 that has sent the reassociation request frame.

After sending the reassociation response frame containing the device ID to be allocated, the coordinator 420 transmits a beacon frame to devices in the piconet to which it belongs. In operation S224, the first device 410 sends a reassociation request frame to the coordinator 420 again based on the device ID contained in the reassociation response frame.

In operation S225, the coordinator 420 sends a reassociation response frame to the first device 410 in response to the reassociation request frame.

After the reassociation response frame is sent, the reassociation process between the first device 410 and the coordinator 420 terminates. In operation S226, the coordinator 420 sends an information frame indicating the reassociation of the first device 410 to other devices in the piconet that it belongs. For example, when the first device 410 and a second device 430 are present on the current piconet, the coordinator 420 may send the information frame to the second device 430.

Figure 10:
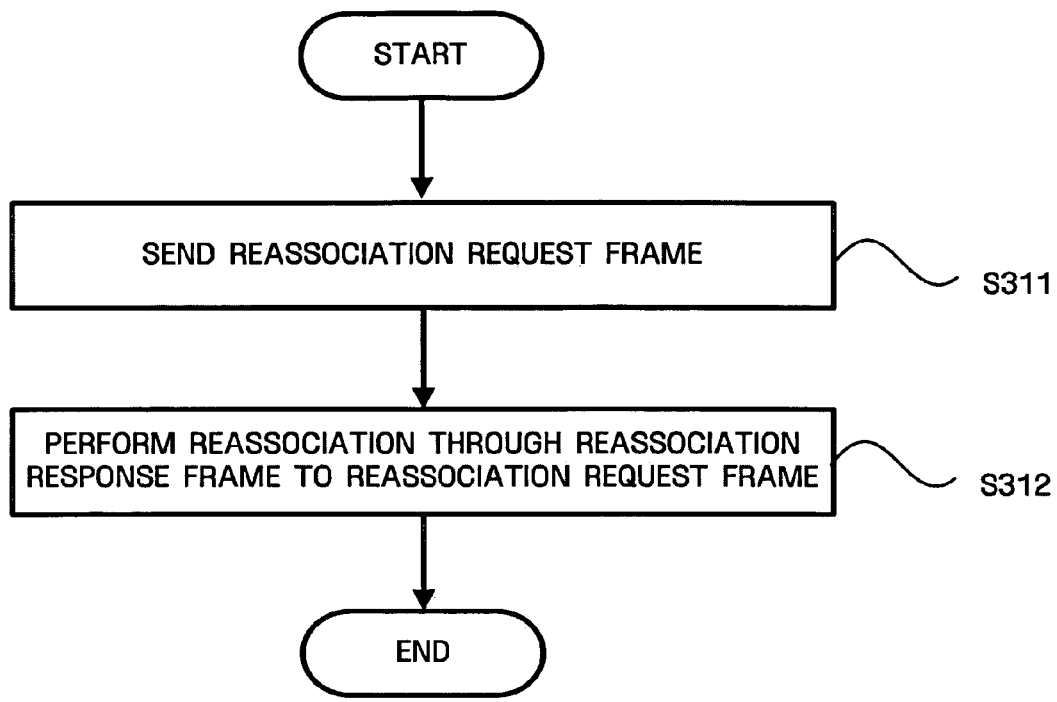
FIG. 10 is a flowchart illustrating a method of reassociating a device attempting to move from the existing wireless network to a new wireless network according to an exemplary embodiment of the present invention.

FIG. 10 is a flowchart illustrating a reassociation process for a device attempting to move to a new piconet according to an exemplary embodiment of the present invention.

Referring to FIG. 10, in operation S311, when moving to a new piconet, the device sends a reassociation request frame containing a device ID allocated by a coordinator of the existing piconet or a predesignated reassociation device ID to a coordinator of the new piconet.

In operation S312, the coordinator of the new piconet performs a reassociation process determined according to the device ID contained in the reassociation request frame in order for the device to reassociate with the new piconet.

When the device ID contained in the reassociation request frame is a device ID allocated by the coordinator of the existing piconet, the first reassociation process may be performed as illustrated in FIG. 8.

Meanwhile, when the device ID is a predesignated reassociation device ID, the second reassociation process may be performed as illustrated in FIG. 9.

A wireless network device and a method of reassociation between wireless networks using the wireless network device can reduce delay time required for the device to move to a new wireless network, thereby improving mobility of the device.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A wireless network device comprising:
   a first frame transceiver which receives a reassociation request frame from another device;
   a device identifier (ID) extractor which extracts a device ID allocated to the other device by a network to which the other device previously belonged from the reassociation request frame; and
   a first controller which determines a reassociation process of the other device that sent the reassociation request frame according to the extracted device ID.

2. The device of claim 1, wherein the first controller determines whether the extracted device ID is the same as one of device IDs allocated to devices of a current wireless network and, if it is determined that the extracted device ID is not the same as one of the device IDs allocated the devices of the current wireless network, terminates the reassociation process of the other device by sending a reassociation response frame to the other device in response to the reassociation request frame.

3. The device of claim 1, wherein the first controller determines whether the extracted device ID is the same as device IDs allocated to devices of the current wireless network and, if it is determined that the extracted device ID is the same as one of the device IDs allocated the devices of the current wireless network, terminates the reassociation process of the other device by sending a first reassociation response frame containing a device ID to be allocated to the other device in response to the reassociation request frame and sending a second reassociation response frame to the other device in response to another reassociation request frame containing the device ID allocated to the other device.

4. The device of claim 1, wherein the first controller terminates the reassociation process of the device by sending a first reassociation response frame containing a device ID to be allocated to the other device in response to the reassociation request frame and then sending a second reassociation response frame to the another device in response to another reassociation request frame containing the device ID allocated to the another device.

5. A wireless network device comprising:
   a frame transceiver which transmits a reassociation request frame to a coordinator of a wireless network to which the wireless network device attempts to move; and
   a controller which performs reassociation to the wireless network through a reassociation process determined according to a device identifier (ID) allocated to the wireless network device by a network to which the wireless network device previously belonged contained in the reassociation request frame.

6. The device of claim 5, wherein if the device ID contained in the reassociation request frame is not the same as one of devices IDs allocated to devices by the wireless network to which the device attempts to move, the controller performs reassociation by receiving a reassociation response frame in response to the reassociation request frame.

7. The device of claim 5, wherein if the device ID contained in the reassociation request frame is the same as one of devices IDs allocated to devices by the wireless network to which the device attempts to move, the controller performs reassociation by receiving a first reassociation response frame containing a device ID to be allocated in response to the reassociation request frame and then receiving a second reassociation response frame in response to another reassociation request frame containing the allocated device ID allocated to the device.

8. The device of claim 5, wherein the controller performs reassociation by receiving a first reassociation response frame containing a device ID to be allocated on the wireless network to which the device attempts to move in response to the reassociation request frame and then receiving a second reassociation response frame in response to another reassociation request frame containing the device ID to be allocated to the device.

9. A method of reassociation between wireless networks using a wireless network device, the method comprising:
   receiving a reassociation request frame from another device;
   extracting a device identifier (ID) allocated to the other device by a network to which the other device previously belonged from the reassociation request frame; and
   determining a reassociation process of the other device that sent the reassociation request frame according to the extracted device ID.

10. The method of claim 9, wherein the determining of the reassociation process comprises:
   determining whether the extracted device ID is the same as one of devices IDs allocated to devices in a current wireless network; and
   terminating the reassociation process of the device, if it is determined that the extracted device ID is not the same as one of the device IDs, by sending a reassociation response frame to the other device in response to the reassociation request frame.

11. The method of claim 9, wherein the determining of the reassociation process comprises:
   determining whether the extracted device ID is the same as one of devices IDs allocated to devices by a current wireless network;
   terminating the reassociation process of the device, if it determined that the extracted device ID is the same as one of the device IDs, by sending a first reassociation response frame containing a device ID to be allocated to the other device in response to the reassociation request frame and then sending a second reassociation response frame to the other device in response to another reassociation request frame containing the device ID allocated to the other device.

12. The method of claim 9, wherein the determining of the reassociation process comprises:
   sending a first reassociation response frame containing a device ID to be allocated to the other device in response to the reassociation request frame; and
   sending a second reassociation response frame to the other device in response to another reassociation request frame containing the device ID allocated to the other device.

13. A method of reassociation between wireless networks using a wireless network device, the method comprising:
   sending a reassociation request frame to a coordinator of a wireless network to which the device attempts to move; and
   performing reassociation to the wireless network through a reassociation process determined according to a device identifier (ID) allocated to the wireless network device by a network to which the wireless network device previously belonged contained in the reassociation request frame.

14. The method of claim 13, wherein in the performing of the reassociation, if the device ID contained in the reassociation request frame is not the same as one of devices IDs allocated to devices in the wireless network to which the device attempts to move, the reassociation is performed by receiving a reassociation response frame in response to the reassociation request frame.

15. The method of claim 13, wherein in the performing of the reassociation, if the device ID contained in the reassociation request frame is the same as one of devices IDs allocated to devices in the wireless network to which the device attempts to move, the reassociation is performed by receiving a first reassociation response frame containing a device ID to be allocated in response to the reassociation request frame and then receiving a second reassociation response frame in response to another reassociation request frame containing the device ID allocated to the device.

16. The method of claim 13, wherein in the performing of the reassociation, the reassociation is performed by receiving a first reassociation response frame containing a device ID to be allocated on the wireless network to which the device attempts to move in response to the reassociation request frame and then receiving a second reassociation response frame in response to another reassociation request frame containing the device ID allocated to the device.

* * * * *